US012769547B2

(12) United States Patent
Chen et al.

(10) Patent No.: US 12,769,547 B2
(45) Date of Patent: Oct. 20, 2026

(54) VECTOR PROCESSING CIRCUIT AND VECTOR PROCESSING METHOD WITH REUSED CALCULATION CIRCUIT

(71) Applicant: ANDES TECHNOLOGY CORPORATION, Hsinchu City (TW)

(72) Inventors: Zhong-Ho Chen, Miaoli County (TW); Jui Chieh Liao, Hsinchu City (TW); Shu-Yu Chang, San Jose, CA (US)

(73) Assignee: ANDES TECHNOLOGY CORPORATION, Hsinchu City (TW)

( * ) Notice: Subject to any disclaimer, the term of this patent is extended or adjusted under 35 U.S.C. 154(b) by 64 days.

(21) Appl. No.: 18/939,572

(22) Filed: Nov. 7, 2024

(65) Prior Publication Data

US 2026/0126998 A1 May 7, 2026

(51) Int. Cl.
*G06F 9/30* (2018.01)
*G06F 9/38* (2018.01)
*G06F 15/78* (2006.01)

(52) U.S. Cl.
CPC ........ *G06F 9/30036* (2013.01); *G06F 9/3836* (2013.01); *G06F 15/7803* (2013.01)

(58) Field of Classification Search
None
See application file for complete search history.

(56) References Cited

U.S. PATENT DOCUMENTS 4,873,630 A * 10/1989 Rusterholz ............ G06F 9/3885 712/E9.071
7,797,363 B2 9/2010 Hokenek et al.
8,447,954 B2 * 5/2013 Jia .......................... G06F 9/5066 709/201
9,588,766 B2 * 3/2017 Caprioli .............. G06F 9/30014
9,858,970 B2 1/2018 Koo
10,108,581 B1 10/2018 Thorson et al.
2004/0004647 A1 1/2004 Kawasaki et al.
2014/0189288 A1 * 7/2014 Hartono ................ G06F 9/3001 712/5
2016/0224514 A1 * 8/2016 Moudgill ............ G06F 9/30101
(Continued)

FOREIGN PATENT DOCUMENTS

| | | |
|---|---|---|
| TW | 201723810 | 7/2017 |
| TW | 201732563 | 9/2017 |
| TW | 202416229 | 4/2024 |

OTHER PUBLICATIONS

Ni, Kai Hwang, "Vector-Reduction Techniques for Arithmetic Pipelines", IEEE Transactions on Computers, vol. C-34, No. 5, pp. 404-411, 1985. (Year: 1985).*
(Continued)

*Primary Examiner* — Idriss N Alrobaye
(74) *Attorney, Agent, or Firm* — JCIPRNET

(57) ABSTRACT

The present disclosure provides a vector processing circuit and a vector processing method. The vector processing circuit includes an instruction queue, multiple calculation circuits, and a control circuit. The instruction queue includes a first reduction instruction and a second reduction instruction. The calculation circuits have multiple pipeline stages. The control circuit is electrically connected to the instruction queue and the calculation circuits. The calculation circuits alternatively generates results of the first reduction instruction and the second reduction instruction over multiple clocks.

7 Claims, 11 Drawing Sheets

(56) References Cited

U.S. PATENT DOCUMENTS

| | | | | |
|---|---|---|---|---|
| 2021/0303305 | A1 | 9/2021 | Tran | |
| 2024/0004662 | A1 | 1/2024 | Adelman et al. | |
| 2024/0184554 | A1 * | 6/2024 | Rapaport | G06F 8/452 |

OTHER PUBLICATIONS

Mark Harris, "Optimizing Parallel Reduction in CUDA", NVIDIA, 2007, pp. 1-38, available at: chrome-extension://efaidnbmnnnibpcajpcglclefindmkaj/https://developer.download.nvidia.com/compute/DevZone/C/html/C/src/reduction/doc/reduction.pdf.

"Notice of allowance of Taiwan Counterpart Application", issued on Aug. 28, 2025, p. 1-p. 4.

* cited by examiner

500

| Clock | Instruction #1 | | | | | | | | Instruction #2 | | | | | | | | Instruction #3 | | | | | | | |
|---|---|---|---|---|---|---|---|---|---|---|---|---|---|---|---|---|---|---|---|---|---|---|---|---|
| | e0 | e1 | e2 | e3 | e4 | e5 | e6 | e7 | e0 | e1 | e2 | e3 | e4 | e5 | e6 | e7 | e0 | e1 | e2 | e3 | e4 | e5 | e6 | e7 |
| 1 | P0 @F1 | | P1 @F1 | | P2 @F1 | | P3 @F1 | | | | | | | | | | | | | | | | | |
| 2 | P0 @F2 | | P1 @F2 | | P2 @F2 | | P3 @F2 | | P0 @F1 | | P1 @F1 | | P2 @F1 | | P3 @F1 | | | | | | | | | |
| 3 | P0 @F3 | | P1 @F3 | | P2 @F3 | | P3 @F3 | | P0 @F2 | | P1 @F2 | | P2 @F2 | | P3 @F2 | | P0 @F1 | | P1 @F1 | | P2 @F1 | | P3 @F1 | |
| 4 | P0 @F1 | | | | P1 @F1 | | | | P0 @F3 | | P1 @F3 | | P2 @F3 | | P3 @F3 | | P0 @F2 | | P1 @F2 | | P2 @F2 | | P3 @F2 | |
| 5 | P0 @F2 | | | | P1 @F2 | | | | P0 @F1 | | | | P1 @F1 | | | | P0 @F3 | | P1 @F3 | | P2 @F3 | | P3 @F3 | |
| 6 | P0 @F3 | | | | P1 @F3 | | | | P0 @F2 | | | | P1 @F2 | | | | P0 @F1 | | | | P1 @F1 | | | |
| 7 | P0 @F1 | | | | | | | | P0 @F3 | | | | P1 @F3 | | | | P0 @F2 | | | | P1 @F2 | | | |
| 8 | P0 @F2 | | | | | | | | P0 @F1 | | | | | | | | P0 @F3 | | | | P1 @F3 | | | |
| 9 | P0 @F3 | | | | | | | | P0 @F2 | | | | | | | | P0 @F1 | | | | | | | |
| 10 | | | | | | | | | P0 @F3 | | | | | | | | P0 @F2 | | | | | | | |
| 11 | | | | | | | | | | | | | | | | | P0 @F3 | | | | | | | |

FIG. 5

600

| Clock | Multiplexer | | pipeline stage F1 | | pipeline stage F2 | | pipeline stage F3 | Output |
|---|---|---|---|---|---|---|---|---|
| | 421 | 422 | Register 311 | Register 312 | Register 321 | Register 322 | Register 332 | |
| 0 | source operand 410 | source operand 410 | | | | | | |
| 1 | source operand 410 | source operand 410 | Instruction #1 e0 | Instruction #1 e1 | | | | |
| 2 | source operand 410 | source operand 410 | Instruction #2 e0 | Instruction #2 e1 | Instruction #1 e0 | Instruction #1 e1 | | |
| 3 | P0 output | P1 output | Instruction #3 e0 | Instruction #3 e1 | Instruction #2 e0 | Instruction #2 e1 | Instruction #1 e0+e1 | Instruction #1 e0+e1 (temp1) |
| 4 | P0 output | P1 output | Instruction #1 e0+e1 | Instruction #1 e2+e3 | Instruction #3 e0 | Instruction #3 e1 | Instruction #2 e0+e1 | Instruction #2 e0+e1 (temp1) |
| 5 | P0 output | P1 output | Instruction #2 e0+e1 | Instruction #2 e2+e3 | Instruction #1 e0+e1 | Instruction #1 e2+e3 | Instruction #3 e0+e1 | Instruction #3 e0+e1 (temp1) |
| 6 | P0 output | P1 output | Instruction #3 e0+e1 | Instruction #3 e2+e3 | Instruction #2 e0+e1 | Instruction #2 e2+e3 | Instruction #1 e0+e1+e2+e3 | Instruction #1 e0+e1+e2+e3 (temp5) |
| 7 | P0 output | P1 output | Instruction #1 e0+e1+e2+e3 | Instruction #1 e4+e5+e6+e7 | Instruction #3 e0+e1 | Instruction #3 e2+e3 | Instruction #2 e0+e1+e2+e3 | Instruction #2 e0+e1+e2+e3 (temp5) |
| 8 | P0 output | P1 output | Instruction #2 e0+e1+e2+e3 | Instruction #2 e4+e5+e6+e7 | Instruction #1 e0+e1+e2+e3 | Instruction #1 e4+e5+e6+e7 | Instruction #3 e0+e1+e2+e3 | Instruction #3 e0+e1+e2+e3 (temp5) |
| 9 | | | Instruction #3 e0+e1+e2+e3 | Instruction #3 e4+e5+e6+e7 | Instruction #2 e0+e1+e2+e3 | Instruction #2 e4+e5+e6+e7 | Instruction #1 e0+e1+e2+e3+e4+e5+e6+e7 | Instruction #1 e0+e1+e2+e3+e4+e5+e6+e7 |
| 10 | | | | | Instruction #3 e0+e1+e2+e3 | Instruction #3 e4+e5+e6+e7 | Instruction #2 e0+e1+e2+e3+e4+e5+e6+e7 | Instruction #2 e0+e1+e2+e3+e4+e5+e6+e7 |
| 11 | | | | | | | Instruction #3 e0+e1+e2+e3+e4+e5+e6+e7 | Instruction #3 e0+e1+e2+e3+e4+e5+e6+e7 |

FIG. 6

900

| Clock | Instruction #1 | | | | | | | | | | | | | | | |
|---|---|---|---|---|---|---|---|---|---|---|---|---|---|---|---|---|
| | e0 | e1 | e2 | e3 | e4 | e5 | e6 | e7 | e8 | e9 | e10 | e11 | e12 | e13 | e14 | e15 |
| 1 | P0 @F1 | | P1 @F1 | | P2 @F1 | | P3 @F1 | | P4 @F1 | | P5 @F1 | | P6 @F1 | | P7 @F1 | |
| 2 | P0 @F2 | | P1 @F2 | | P2 @F2 | | P3 @F2 | | P4 @F2 | | P5 @F2 | | P6 @F2 | | P7 @F2 | |
| 3 | P0 @F3 | | P1 @F3 | | P2 @F3 | | P3 @F3 | | P4 @F3 | | P5 @F3 | | P6 @F3 | | P7 @F3 | |
| 4 | P0 @F1 | | | | P1 @F1 | | | | P2 @F1 | | | | P3 @F1 | | | |
| 5 | P0 @F2 | | | | P1 @F2 | | | | P2 @F2 | | | | P3 @F2 | | | |
| 6 | P0 @F3 | | | | P1 @F3 | | | | P2 @F3 | | | | P3 @F3 | | | |
| 7 | P0 @F1 | | | | | | | | P1 @F1 | | | | | | | |
| 8 | P0 @F2 | | | | | | | | P1 @F2 | | | | | | | |
| 9 | P0 @F3 | | | | | | | | P1 @F3 | | | | | | | |
| 10 | P0 @F1 | | | | | | | | | | | | | | | |
| 11 | P0 @F2 | | | | | | | | | | | | | | | |
| 12 | P0 @F3 | | | | | | | | | | | | | | | |

FIG. 9

1000

| Clock | Instruction #1 | | | | | | | | | | | | | | | |
|---|---|---|---|---|---|---|---|---|---|---|---|---|---|---|---|---|
| | e0 | e1 | e2 | e3 | e4 | e5 | e6 | e7 | e8 | e9 | e10 | e11 | e12 | e13 | e14 | e15 |
| 1 | P0 @F1 | | P1 @F1 | | P2 @F1 | | P3 @F1 | | P4 @F1 | | P5 @F1 | | P6 @F1 | | P7 @F1 | |
| 2 | P0 @F2 | | P1 @F2 | | P2 @F2 | | P3 @F2 | | P4 @F2 | | P5 @F2 | | P6 @F2 | | P7 @F2 | |
| 3 | P0 @F1 | | | | P1 @F1 | | | | P2 @F1 | | | | P3 @F1 | | | |
| 4 | P0 @F2 | | | | P1 @F2 | | | | P2 @F2 | | | | P3 @F2 | | | |
| 5 | P0 @F1 | | | | | | | | P1 @F1 | | | | | | | |
| 6 | P0 @F2 | | | | | | | | P1 @F2 | | | | | | | |
| 7 | P0 @F1 | | | | | | | | | | | | | | | |
| 8 | P0 @F2 | | | | | | | | | | | | | | | |

FIG. 10

VECTOR PROCESSING CIRCUIT AND VECTOR PROCESSING METHOD WITH REUSED CALCULATION CIRCUIT

BACKGROUND

Technical Field

This disclosure relates to a vector processing circuit and a vector processing method, particularly to a circuit and a method for performing reduction operations on vectors.

Description of Related Art

In vector processing, reduction operation is a frequently used operation that reduces multiple elements in a vector to a single result through specific calculations (such as addition, multiplication, logical operations, etc.). However, the execution sequence of the reduction operation has a significant impact on the final result, especially in floating-point calculations, as different calculation sequences may lead to precision loss or result discrepancies. This sequence dependency poses challenges for parallel processing in multi-core or multi-threaded environments, as different threads may access and process data in different orders. Since reduction operations often appear in fields such as scientific computing, machine learning, and signal processing, accelerating these operations to improve overall system performance has become an important issue.

SUMMARY

This disclosure proposes a vector processing circuit and a vector processing method that execute reduction instructions in an interleaved manner.

Embodiments of the present disclosure provide a vector processing circuit including an instruction queue, multiple calculation circuits, and a control circuit. The instruction queue includes a first reduction instruction and a second reduction instruction. The calculation circuits have multiple pipeline stages. The control circuit is electrically connected to the instruction queue and the calculation circuits. The calculation circuits alternatively generates results of the first reduction instruction and the second reduction instruction over multiple clocks.

In some embodiments, the calculation circuit sequentially generates temporary results of the first reduction instruction, temporary results of the second reduction instruction, a final result of the first reduction instruction, and a final result of the second reduction instruction.

In some embodiments, the calculation circuits includes a first calculation circuit and a second calculation circuit. The first calculation circuit generates a temporal result and the final result of the first and the second reductions instructions. The second calculation circuit generates a temporal result of the first and the second reductions instructions.

In some embodiments, the control circuit includes: a source operand electrically connected to the second calculation circuit; and a selection circuit electrically connected to the source operand, the first calculation circuit and the second calculation circuit.

In some embodiments, the selection circuit includes a multiplex. An input of the multiplex is connected to the source operand and the second calculation circuit. An output of the multiplex is connected to the first calculation circuit.

In some embodiments, the first and the second reduction instructions are floating-point reduction instructions. The pipeline stages include a shift stage.

In some embodiments, the first and the second reduction instructions are floating point reduction sum instructions. The pipeline stages include a normalization stage.

From another aspect, embodiments of the present disclosure provide a vector processing method performed by a vector processing circuit. The vector processing method including: storing a first reduction instruction and a second reduction instruction in an instruction queue; and alternatively generating, by multiple calculation circuits, results of the first reduction instruction and the second reduction instruction over multiple clocks, wherein the calculation circuits have multiple pipeline stages.

In some embodiments, the step of alternatively generating the results of the first reduction instruction and the second reduction instruction includes: sequentially generating temporary results of the first reduction instruction, temporary results of the second reduction instruction, a final result of the first reduction instruction, and a final result of the second reduction instruction.

In some embodiments, the calculation circuits includes a first calculation circuit and a second calculation circuit. The vector processing method includes: generating, by the first calculation circuit, a temporal result and the final result of the first and the second reductions instructions; and generating, by the second calculation circuit, a temporal result of the first and the second reductions instructions.

To make the aforementioned features and advantages of this disclosure more evident and understandable, examples are provided below with detailed explanations in conjunction with the accompanying FIGS.

BRIEF DESCRIPTION OF THE DRAWINGS

FIG. 5 is a table illustrating which pipeline stage processes which element in each clock according to the first embodiment.

FIG. 6 is a schematic diagram illustrating the calculations of each pipeline stage in the calculation circuit P0 according to the first embodiment.

FIG. 9 is a table illustrating which pipeline stage processes which element in each clock according to the third embodiment.

FIG. 10 is a table illustrating which pipeline stage processes which element in each clock according to a fourth embodiment.

DESCRIPTION OF THE EMBODIMENTS

Some embodiments of the present disclosure will now be described in detail with reference to the accompanying drawings. When the same component symbols appear in different drawings, they will be considered as the same or similar components. These embodiments are only a part of the disclosure and do not disclose all possible embodiments of the disclosure. More precisely, these embodiments are examples of the systems and methods in the scope of patent claims of this invention.

Regarding the use of "first," "second," etc. in this document, they do not specifically indicate order or sequence. They are only used to distinguish components or operations described with the same technical terms.

Figure 1:
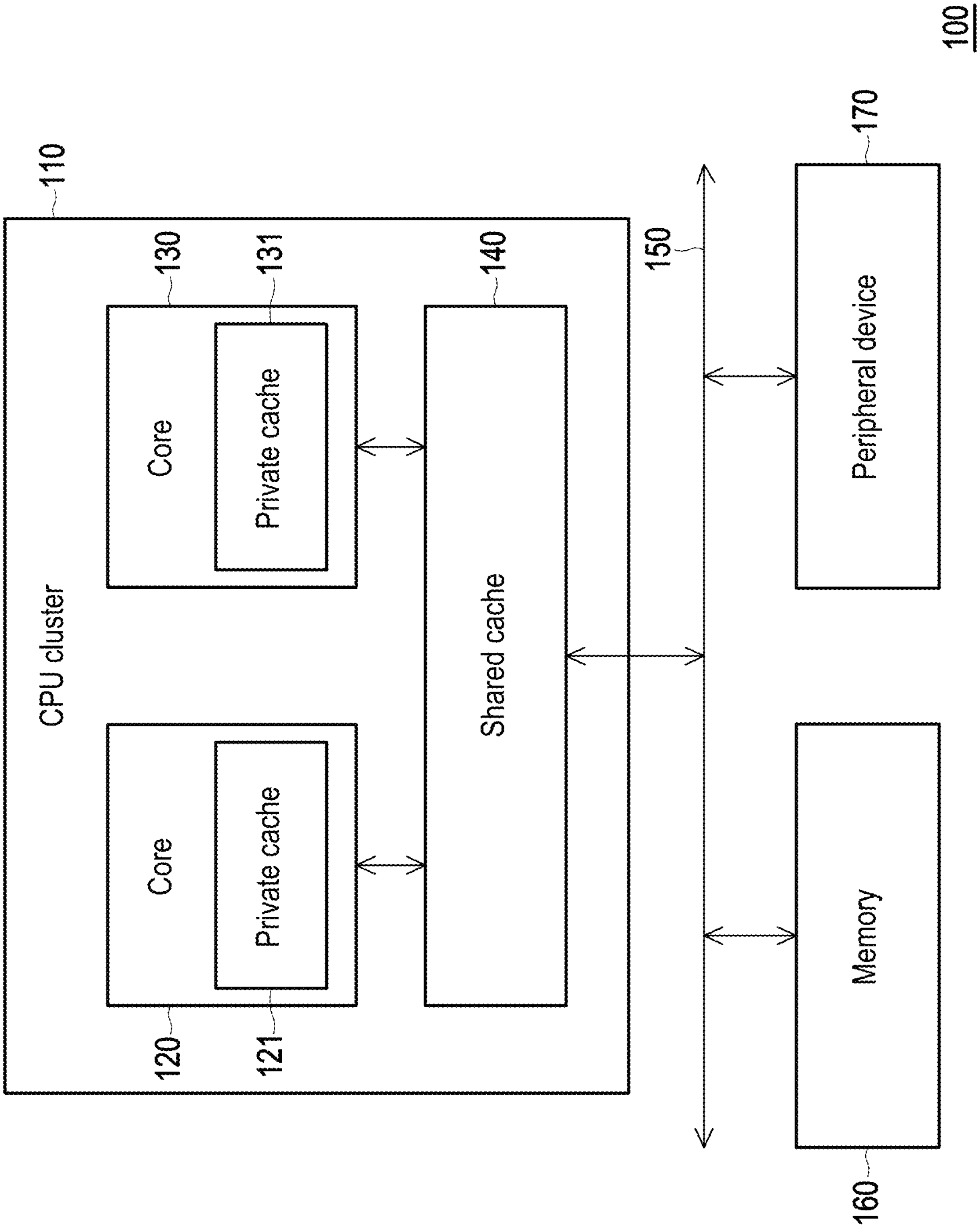
FIG. 1 is a partial block diagram illustrating an electronic device according to an embodiment.

FIG. 1 is a partial block diagram illustrating an electronic device according to an embodiment. Referring to FIG. 1, the electronic device 100 may be a smartphone, various forms of computers, or various electronic devices with computing capabilities. The electronic device 100 includes a central processor unit (CPU) cluster 110, a bus 150, a memory 160, and a peripheral device 170. The CPU cluster 110 is electrically connected to the memory 160 and the peripheral device 170 through the bus 150. The peripheral device 170 may be a keyboard, a mouse, a microphone, a communication device, a display device, etc., but the present invention is not limited to these. The CPU cluster 110 includes one or more cores, with a core 120 and a core 130 illustrated in FIG. 1, but the present invention does not limit the count of cores. The CPU cluster 110 also includes a shared cache 140, which is electrically connected to the core 120 and the core 130. The core 120 includes a private cache 121, and the core 130 includes a private cache 131, where the private cache 121 and the private cache 131 are electrically connected to the shared cache 140. The vector processing circuit proposed herein is located in the core 120 and/or the core 130.

Figure 2:
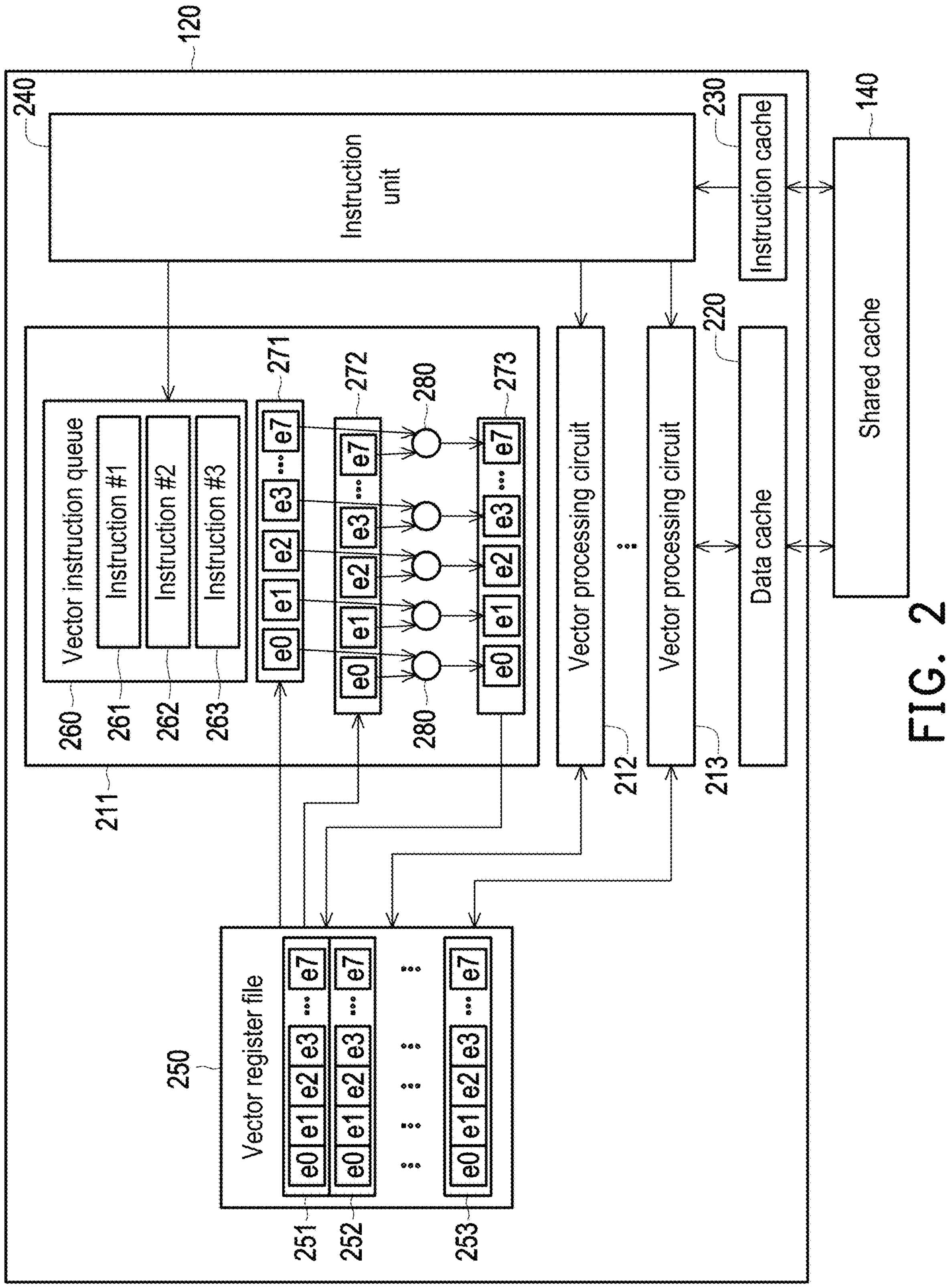
FIG. 2 is a block diagram illustrating a core according to an embodiment.

FIG. 2 is a block diagram illustrating a core according to an embodiment. Referring to FIG. 2, the core 120 is taken as an example for explanation. The core 120 includes multiple vector processing circuits 211-213, a data cache 220, an instruction cache 230, an instruction unit 240, and a vector register file 250. Data obtained from the shared cache 140 is stored in the data cache 220, while instructions obtained from the shared cache 140 are stored in the instruction cache 230. These instructions are also provided to the instruction unit 240, which is used to decode instructions and determine the execution sequence of instructions. In this embodiment, three vector processing circuits 211-213 are illustrated, but the present invention does not limit the count of vector processing circuits in a core. The vector register file 250 includes multiple vector registers 251-253, each register is used to store a vector. In FIG. 2, each vector includes 8 elements e0-e7, but the present invention does not limit the count of elements in a vector, nor does it limit the count of bits included in each element. The technology disclosed below may be applied to vectors of any length and may be applied to any count of elements.

Taking the vector processing circuit 211 as an example, the vector processing circuit 211 includes a vector instruction queue 260 (also referred to as an instruction queue), source operands 271-272, a destination operand 273, and multiple calculation circuits (such as calculation circuit 280). The vector instruction queue 260 is used to store multiple reduction instructions 261-263. The reduction instruction 261-263 may be floating-point reduction instruction, floating-point reduction sum instructions, floating-point reduction max instructions, etc.

Figure 11:
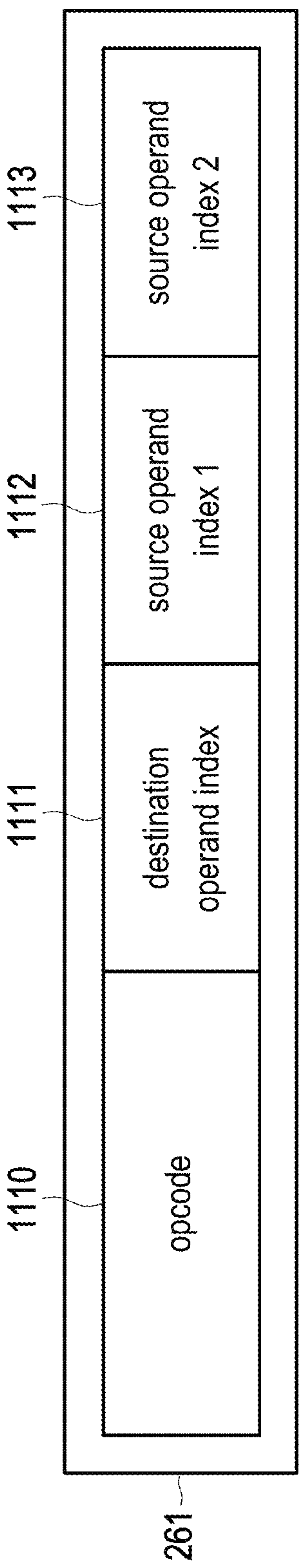
FIG. 11 is a diagram illustrating the instruction according to an embodiment.

FIG. 11 is a block diagram illustrating the instructions 261-263 according to an embodiment. The instruction 261 includes an opcode 1110, a destination operand index 1111, and two source operand indexes 1112 and 1113. The source and destination operand indexes are indexes to the vector registers 251-253 of the vector register file 250. The following Table 1 lists some possible instructions and their corresponding operations. When a reduction instruction is executed, the associated operations are performed. The notation v0[0] refers to e0 of the vector register 251, v31[7] refers to e7 of the vector register 253, and so on. When the add instruction in Table 1 is executed, the v31[0] stores the result of v0[0]+v1[0], v31[1] stores the result of v0[1]+v1[1], and so on. Similarly, when the sub instruction in Table 1 is executed, the v31[0] stores the result of v0[0]-v1[0], v31[1] stores the result of v0[1]-v1[1], and so on. The source operands of the add or the sub instruction are two vectors, and the destination operand is also a vector. The source operand of a reduction instruction is a vector, and the destination operand is a scalar element. For the reduction sum instruction in Table 1, the v31[0] holds the result of v0[0]+v0[1]+v0[2]+v0[3]+v0[4]+v0[5]+v0[6]+v0[7].

TABLE 1

| Opcode | Destination Index | Source Index 1 | Source Index 2 | Operation |
|---|---|---|---|---|
| add | v31 | v0 | v1 | v31[0] = v0[0] + v1[0]<br>v31[1] = v0[1] + v1[1]<br>. . .<br>v31[1] = v0[7] + v1[7] |
| sub | v31 | v9 | v1 | v31[0] = v0[0] − v1[0]<br>v31[1] = v0[1] − v1[1]<br>. . .<br>v31[1] = v0[7] − v1[7] |
| reduction sum | v31 | v0 | n.a. | v31[0] = v0[0] + v0[1] + v0[2] + v0[3] + v0[4] + v0[5] + v0[6] + v0[7] |

The source operands 271-272 hold the input values of an instruction. When executing an instruction, the vector processing circuit 260 extracts source operand 271-272 from the vector register file 250 according to the source operand indexes 1112-1113 of the instruction. For example, when executing the add instruction in the Table 1, the source operand 271 holds the values of v0[0], v0[1], . . . , v0[7], while the source operand 272 holds the value of v1[0], v1[1], . . . , v1[7].

The destination operand 273 holds the final results of an instruction. When executing an instruction, the vector processing circuit 260 writes destination operand back to the vector register file 250 according to the destination operand index 1111. For example, when executing the add instruction in the Table 1, the destination operand 273 holds the result of v0[0]+v1[0], v0[1]+v1[1], . . . , v0[7]+v1[7].

The calculation circuits 280 produce the destination operand from the source operands according to the opcode 1110 of an instruction. The calculation circuits 280 are configured to perform addition, subtraction, multiplication, division, maximum value, various logical operations, and etc. according to the opcode of an instruction. The calculation circuit 280 includes multiple pipeline stages, which execute the reduction instruction in an interleaved manner while maintaining the correct execution sequence. Moreover, some of the calculation circuit 280 may be reused. Several embodiments will be illustrated below.

First Embodiment

Figure 3:
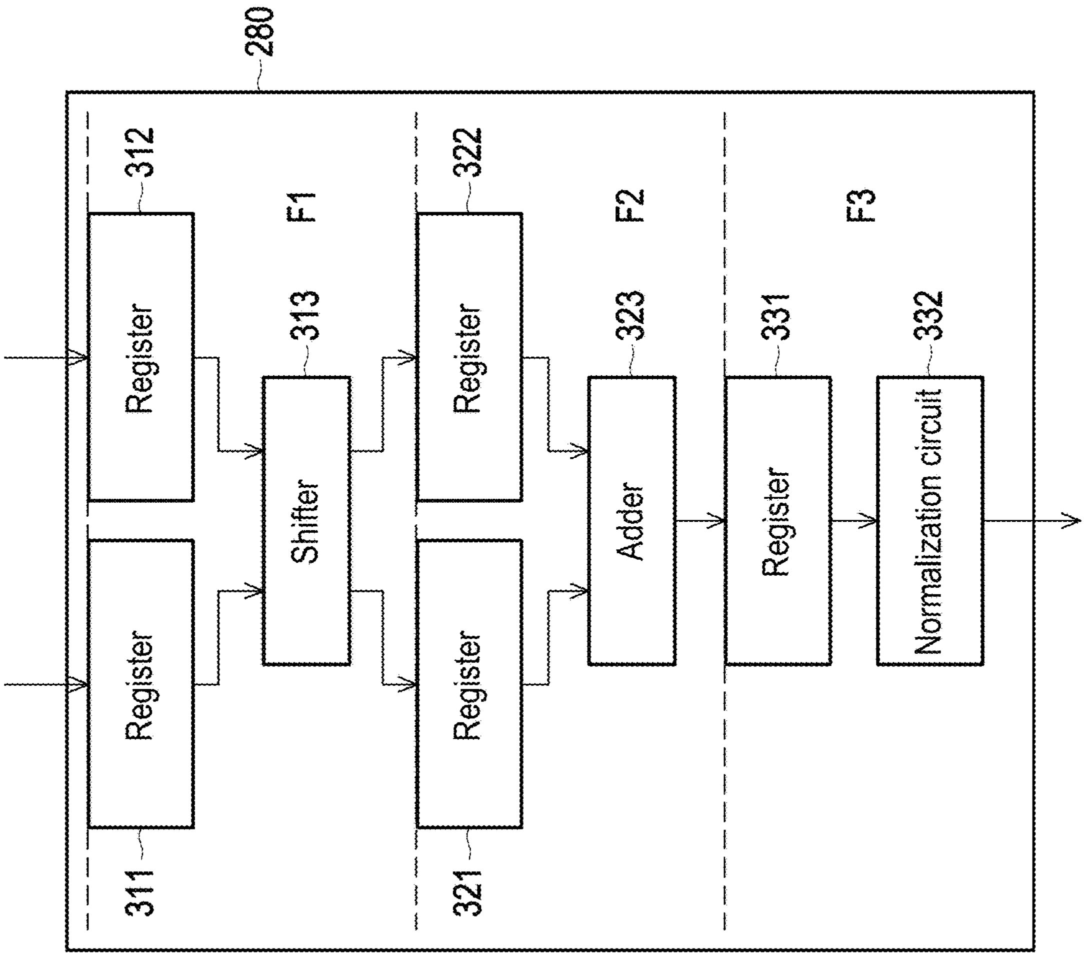
FIG. 3 is a schematic diagram illustrating multiple pipeline stages in the calculation circuit according to a first embodiment.

In the first embodiment, the reduction instruction is configured to perform a reduction sum, therefore the calculation circuit 280 is configured to perform addition. FIG. 3 is a diagram illustrating multiple pipeline stages in the calculation circuit according to the first embodiment. In the embodiment of FIG. 3, a floating-point addition is divided into three stages, corresponding to pipeline stages F1-F3, which are configured to perform shift, addition, and normalization, respectively. The pipelines stages F1-F3 are also referred to a shift stage, an addition stage and a normalization stage, respectively.

Specifically, the pipeline stage F1 includes registers 311, 312, and a shifter 313. The register 311 stores a first operand, while the register 312 stores a second operand. The first operand and the second operand belong to two elements in the vector respectively, both of these elements are floating point numbers. The bit count of the floating-point number may be 16, 32, 64 or other values, which is not limited in this invention. The shifter 313 shifts the fraction according to the exponents of the two operands. For example, in the IEEE 754 standard, a 32-bit floating point number includes 1 bit for sign, 8 bits for exponent, and 23 bits for fraction. Suppose the first operand is the value "3.5", represented as $1.11_2\times2^1$; the second operand is the value "0.5", represented as $1.0_2\times2^{-1}$. To perform addition, the exponents must be the same, so the fraction of "0.5" can be shifted to be represented as $0.01_2\times2^1$. Moreover, the first operand does not need to be shifted.

The pipeline stage F2 includes registers 321, 322, and an adder 323. The register 321 stores the first operand, represented as $1.11_2\times2^1$, while the register 322 stores the shifted second operand, represented as $0.01_2\times2^1$. Next, the adder 323 performs addition on the fractions of the two operands, while the exponent remains unchanged. The result after addition is represented as $10.00_2\times2^1$.

The pipeline stage F3 includes a register 331 and a normalization circuit 332. The register 331 stores the calculation result from the adder 323, represented as $10.00_2\times2^1$. The normalization circuit 332 normalizes the calculation result. In this embodiment, the normalized result is represented as $1.00_2\times2^2$. In this embodiment, the floating-point addition is used as an illustration, but the calculation circuit 280 may also be used for integer addition. This invention is not limited to the above examples.

Figure 4:
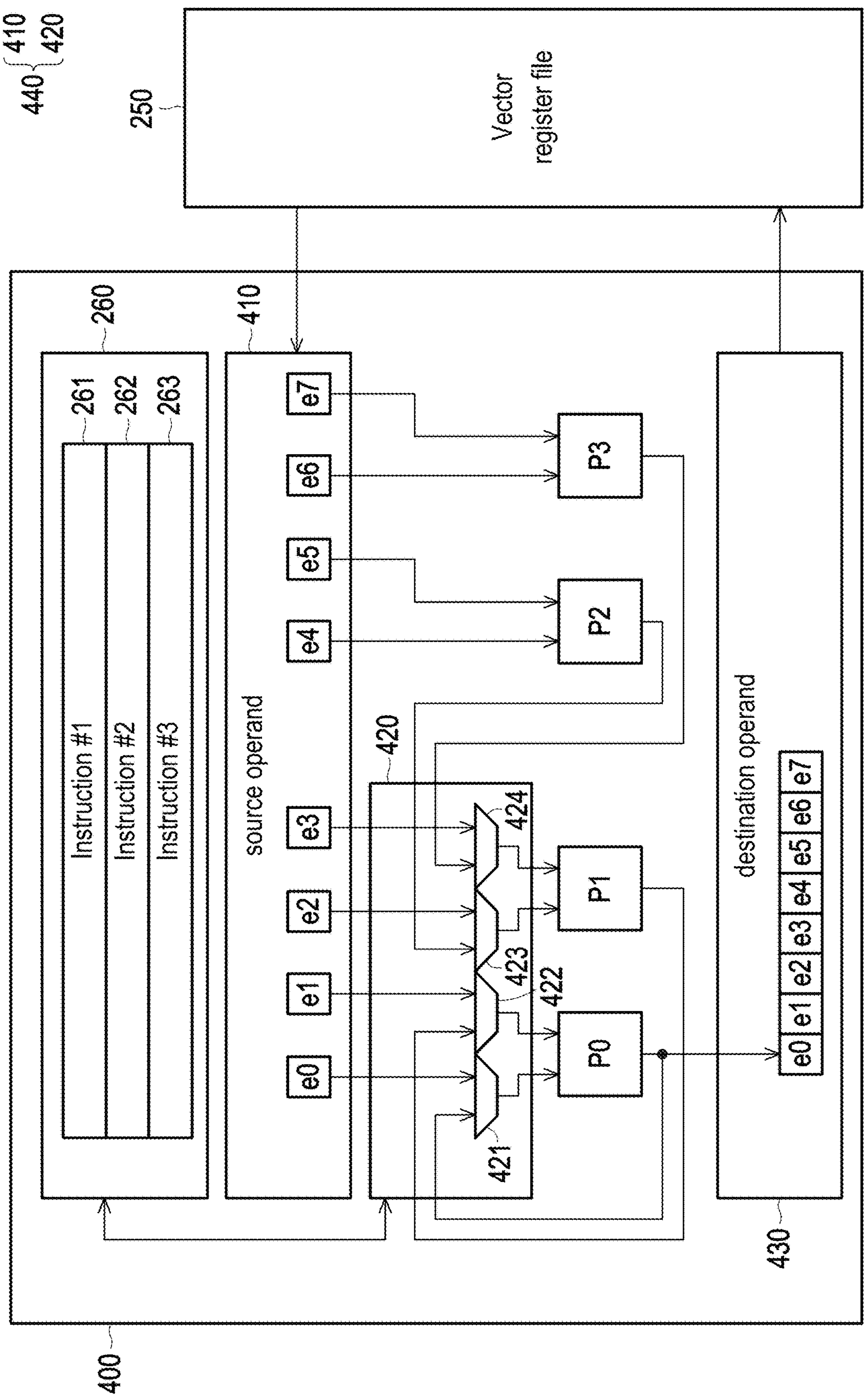
FIG. 4 is a partial circuit diagram illustrating a vector processing circuit according to the first embodiment.

FIG. 4 is a partial circuit diagram illustrating a vector processing circuit according to the first embodiment. In the embodiment of FIG. 4, a vector processing circuit 400 is drawn, which may be applied to the vector processing circuits 211-213 in FIG. 2. The vector processing circuit 400 includes a vector instruction queue 260 (also referred to as an instruction queue), a source operand 410, a selection circuit 420, calculation circuits P0-P3, and a destination operand 430. The source operand 410 and the selection circuit 420 are collectively referred to a control circuit 440. The control circuit 440 is electrically connected to the instruction queue 260 and the calculation circuits P0-P3.

The source operand 410 is extracted from the vector register file 250 and includes multiple elements e0-e7. The selection circuit 420 is electrically connected to the source operand 410, and the selection circuit 420 includes multiplexers 421-424. The calculation circuits P0, P1 are electrically connected to selection circuit 420, while the calculation circuits P2, P3 are electrically connected to the selection circuit 420 and the source operand 410.

The calculation results of the calculation circuits P2, P3 are transmitted to the selection circuit 420, and the calculation results of the calculation circuits P0, P1 are also fed back to the selection circuit 420. The selection circuit 420 selects appropriate data for the calculation circuits P0, P1. A vector reduction sum is completed over multiple iterations. Each iteration generates results of the reduction instruction over multiple clocks. The first iteration generates temporary results from the source operand, and the last iteration generates the final result from the temporal results. The temporary results consist of multiple elements, and the final result is a scalar element. The results of different iterations cannot be generated in a clock, because of the data dependency. During these iterations, the temporary results generated by the calculation circuits P0-P3 are passed from the right to the left, and the calculation circuits at the left-hand side are reused. Specifically, in a first iteration, the selection circuit 420 transmits the elements e0-e3 to the calculation circuits P0, P1, while the calculation circuits P2, P3 receive the elements e4-e7; in a second iteration, the selection circuit 420 transmits the temporary results generated by the calculation circuits P2, P3 to the calculation circuit P1, and the selection circuit 420 also transmits the temporary results generated by the calculation circuits P0, P1 to the calculation circuit P0. In a third iteration, the selection circuit 420 transmits the temporary results generated by the calculation circuits P0, P1 to the calculation circuit P0. Finally, the calculation circuit P0 generates the result of the reduction sum, which is stored in the destination operand 430.

From another perspective, in the first iteration, the calculation circuit P0 generates a temporary result temp1=e0+e1, the calculation circuit P1 generates a temporary result temp2=e2+e3, the calculation circuit P2 generates a temporary result temp3=e4+e5, and the calculation circuit P3 generates a temporary result temp4=e6+e7. In the second iteration, the calculation circuit P1 generates a temporary result temp6=temp3+temp4, and the calculation circuit P0 generates a temporary result temp5=temp1+temp2. In the third iteration, the calculation circuit P0 generates the result (i.e. final=temp5+temp6), which is written to the destination operand 430. In this embodiment, a vector includes 8 elements, thus requiring log 2 8=3 iterations. If the vector includes more elements, more iterations would be needed to complete a reduction instruction.

Moreover, each calculation circuit P0-P3 includes multiple pipeline stages (as shown in FIG. 3). These pipeline stages execute multiple reduction instructions in an interleaved manner. In other words, the temporary results of multiple instructions are generated in an alternating sequence. For example, the calculation circuits P0-P3 alternatively generates results of a first reduction instruction and a second reduction instruction over multiple clocks.

The following will explain in conjunction with the operation of the multiplexers 421-424 and the design of the pipeline. First, the output of each multiplexer 421-424 is electrically connected to one of the calculation circuits P0, P1. Specifically, the outputs of the multiplexers 421, 422 are electrically connected to the calculation circuit P0, and the outputs of the multiplexers 423, 424 are electrically connected to the calculation circuit P1. The first inputs (on the right-hand side) of the multiplexers 421-424 are electrically connected to the source operand 410. The second inputs (on the left-hand side) of the multiplexers 421, 422 are electrically connected to the calculation circuits P0, P1 respectively, while the second inputs (on the left-hand side) of the multiplexers 423, 424 are electrically connected to the calculation circuits P2, P3 respectively.

FIG. 5 is a table illustrating which pipeline stage processes which element in each clock according to the first embodiment. Referring to FIG. 4 and FIG. 5, rows of a table 500 correspond to 11 clocks respectively, and 24 columns correspond to 24 elements in 3 instructions respectively.

In the first clock, the multiplexers 421-424 transmit the elements e0-e3 belonging to the first reduction instruction from the source operand 410 to the calculation circuits P0, P1, where the elements e0, e1 are processed at the pipeline stage F1 of the calculation circuit P0 (written as P0@F1 in the table 500, and so on), the elements e2, e3 are processed at the pipeline stage F1 of the calculation circuit P1. Moreover, the elements e4, e5 of the first reduction instruction are processed at the pipeline stage F1 of the calculation circuit P2, the elements e6, e7 of the first reduction instruction are processed at the pipeline stage F1 of the calculation circuit P3. In other words, the pipeline stages F1 of the calculation circuits P0-P3 execute the first reduction instruction.

In the second clock, the multiplexers 421-424 transmit the elements e0-e3 belonging to the second reduction instruction from the source operand 410 to the calculation circuits P0, P1, where the pipeline stage F1 executes the second reduction instruction. Moreover, the pipeline stage F2 executes the first reduction instruction. For example, the second pipeline stage F2 of the calculation circuit P0 adds the elements e0, e1; the second pipeline stage F2 of the calculation circuit P1 adds elements e2, e3; the second pipeline stage F2 of the calculation circuit P2 adds elements e4, e5; the second pipeline stage F2 of the calculation circuit P3 adds the elements e6, e7. In other words, in the second clock, the pipeline stage F2 executes the first reduction instruction, while pipeline stage F1 executes the second reduction instruction.

In the third clock, the multiplexers 421-424 transmit the elements e0-e3 belonging to the third reduction instruction from the source operand 410 to the calculation circuits P0, P1, where the pipeline stage F1 executes the third reduction instruction. In other words, in the third clock, the pipeline stage F3 executes the first reduction instruction, while the pipeline stage F2 executes the second reduction instruction, and the pipeline stage F1 executes the third reduction instruction. From another perspective, the first pipeline stage F1 in the calculation circuits P0-P3 executes the first reduction instruction, the second reduction instruction, and the third reduction instruction in the first three clock respectively.

In the fourth clock, the multiplexers 421, 422 transmit the temporary results temp1, temp2 generated by the calculation circuits P0, P1 to the calculation circuit P0; the multiplexers 423, 424 transmit the temporary results temp3, temp4 generated by the calculation circuits P2, P3 to the calculation circuit P1. The first pipeline stage F1 of the calculation circuit P0 processes the temporary results temp1, temp2 (corresponding to the elements e0-e3), while the first pipeline stage of the calculation circuit P1 processes the temporary results temp3, temp4 (corresponding to the elements e4-e7). Additionally, the third pipeline stage F3 of the calculation circuits P0-P3 executes the second reduction instruction, and the second pipeline stage F2 of calculation circuits P0-P3 executes the third reduction instruction. The fifth clock and the sixth clock follow the same pattern.

From another perspective, in the fourth clock, the pipeline stages F1 in the calculation circuits P0, P1 process the temporary results temp1-temp4 corresponding to the first reduction instruction. However, in the fifth clock, the pipeline stages F1 in the calculation circuits P0, P1 process the temporary results temp1-temp4 corresponding to the second reduction instruction. A pipeline stage processes different reduction instructions in different clock, thus conforming to the interleaved design.

In the seventh clock, the multiplexers 421, 422 transmit the temporary results temp5, temp6 generated by the calculation circuits P0, P1 to the calculation circuit P0, where the pipeline stage F1 processes them. Specifically, the calculation result (e0+e1+e2+e3) of the calculation circuit P0 is fed back to the input of calculation circuit P0, while the calculation result (e4+e5+e6+e7) of the calculation circuit P1 is also transmitted to the input of the calculation circuit P0. Additionally, the third pipeline stage F3 of the calculation circuits P0-P3 executes the second reduction instruction, and the second pipeline stage F2 of calculation circuits P0-P3 executes the third reduction instruction. The eighth to eleventh clock follow the same pattern.

From FIG. 5, it can be clearly seen that the pipeline stages F1-F3 execute 3 reduction instructions in an interlaced manner. The calculation circuit P0-P3 sequentially generates temporary results (e.g. temp1-temp4) of the first reduction instruction, temporary results (e.g. temp1-temp 4) of the second reduction instruction, a final result of the first reduction instruction, and a final result of the second reduction instruction. In some embodiments, the 1st to 3rd clocks are called the first iteration corresponding to the first reduction instruction, the 4th to 6th clocks are called the second iteration corresponding to the first reduction instruction, and the 7th to 9th clocks are called the third iteration corresponding to the first reduction instruction. Similarly, the 2nd to 4th clocks are called the first iteration corresponding to the second reduction instruction, the 5th to 7th clocks are called the second iteration corresponding to the second reduction instruction, and the 8th to 10th clocks are called the third iteration corresponding to the second reduction instruction.

Note that the calculation circuit P0 is used several times. The calculation circuit P0 generates a temporal result (e.g. temp 1 and temp6) and the final result of the first and the second reduction instructions. The calculation circuit P1-P3 generates a temporal result (e.g. temp2-5) of the first and the second reduction instructions.

From another perspective, the operation of the calculation circuit P0 is explained here. FIG. 6 illustrates the calculation diagram of each pipeline stage in calculation circuit P0 according to the first embodiment. Please refer to FIG. 3, FIG. 4, and FIG. 6. A table 600 only describes the operations of the multiplexers 421, 422, and the calculation circuit P0.

Before the first clock, the multiplexer 421 selects elements belonging to the first reduction instruction from the source operand 410, and the multiplexer 422 also selects elements belonging to the first reduction instruction from the source operand 410.

In the first clock, the two registers 311, 312 in the pipeline stage F1 stores the elements e0, e1 of the first reduction instruction, respectively. Meanwhile, the multiplexer 421 selects elements belonging to the second reduction instruction from the source operand 410, and the multiplexer 422 also selects elements belonging to the second reduction instruction from the source operand 410.

In the second clock, the registers 321, 322 in the pipeline stage F2 store elements e0, e1 of the first reduction instruction, respectively. The two registers 311, 312 in pipeline stage F1 are used to store elements e0, e1 of the second reduction instruction, respectively. The pipeline stage F2 executes the first reduction instruction, while pipeline stage F1 executes the second reduction instruction. Meanwhile, the multiplexer 421 selects elements belonging to the third reduction instruction from the source operand 410, and the multiplexer 422 selects elements belonging to the third reduction instruction from the source operand 410.

In the third clock, the register 331 in the pipeline stage F3 stores the sum of the two elements e0, e1 corresponding to the first reduction instruction. The pipeline stage F3 executes the first reduction instruction, the pipeline stage F2 executes the second reduction instruction, and the pipeline stage F1 executes the third reduction instruction. The output of the calculation circuit P0 is the temporary result (temp1). Meanwhile, the multiplexer 421 selects the temporary result temp1 generated by the calculation circuit P0, and the multiplexer 422 selects the temporary result temp2 generated by the calculation circuit P1. The 4th and 5th clock follow a similar pattern.

In the sixth clock, the pipeline stage F3 generates the sum of two temporary results temp1 and temp2. The pipeline stage F3 executes the first reduction instruction, the pipeline stage F2 executes the second reduction instruction, and the pipeline stage F1 executes the third reduction instruction. The multiplexer 421 selects the temporary result temp5 generated by the calculation circuit P0, and the multiplexer 422 selects the temporary result temp6 generated by the calculation circuit P1. Subsequent clocks follow a similar pattern.

Second Embodiment

Figure 7:
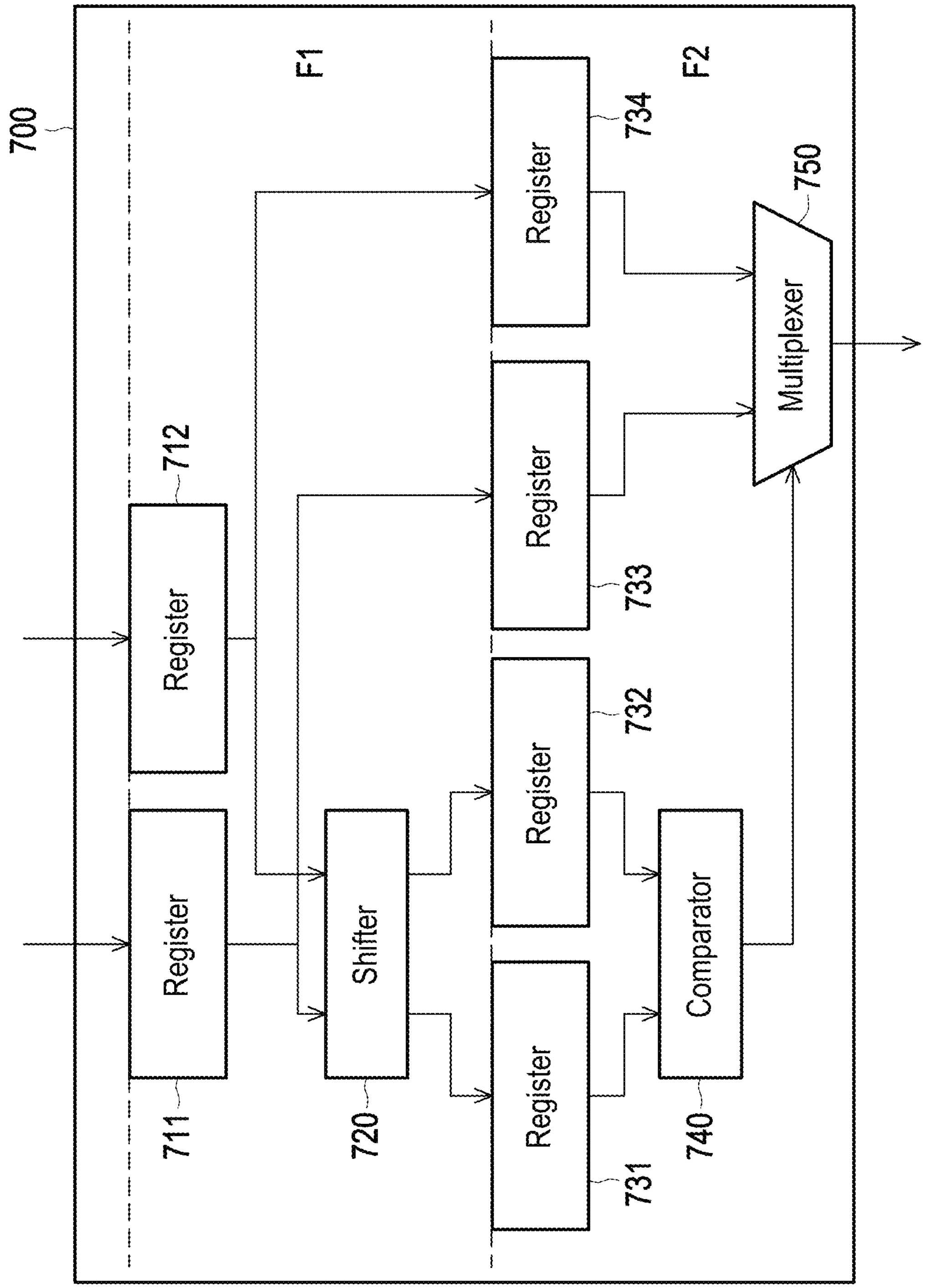
FIG. 7 is a circuit schematic diagram illustrating multiple pipeline stages in the calculation circuit according to a second embodiment.

In the second embodiment, the reduction instruction is configured to perform a reduction max operation. The vector processing circuit in the second embodiment is similar to that of the first embodiment (as shown in FIG. 4), with the difference being that each calculation circuit P0-P3 executes a maximum calculation. FIG. 7 illustrates a circuit diagram of multiple pipeline stages in the calculation circuit according to the second embodiment. Referring to FIG. 7, a calculation circuit 700 may be applied to the calculation circuits P0-P3 in FIG. 4. The calculation circuit 700 includes pipeline stages F1 and F2, which are used to execute shifting and comparison, respectively. Specifically, the pipeline stage F1 includes registers 711, 712, and a shifter 720. The register 711 is used to store a first operand, and the register 712 is used to store a second operand. The registers 711, 712 are electrically connected to the shifter 720, which is used to shift the fractions of the two operands according to their exponents, so that the exponents of the two operands are the same.

The pipeline stage F2 includes registers 731-734, a comparator 740, and a multiplexer 750. The register 731 is used to store the shifted first operand, the register 732 is used to store the shifted second operand, the register 733 is used to store the original first operand, and the register 734 is used to store the original second operand. The comparator 740 is electrically connected to the registers 731, 732, and is used to compare the two shifted operands to generate a comparison result, which indicates which operand is greater. This comparison result is also transmitted to the multiplexer 750. The multiplexer 750 is also electrically connected to the registers 733, 734, and selects the greater operand as the output according to the comparison result.

Referring to FIG. 4 and FIG. 7, during a first iteration, the multiplexers 421-424 transmit elements e0-e3 from the source operand 410 to the calculation circuits P0, P1, while the calculation circuits P2, P3 obtain elements e4-e7 from the source operand 410. The calculation circuit P0 generates a temporary result temp1=max (e0,e1), the calculation circuit P1 generates a temporary result temp2=max (e2,e3), the calculation circuit P2 generates a temporary result temp3=max (e4,e5), and the calculation circuit P3 generates a temporary result temp4=max (e6,e7).

In a second iteration, the multiplexers 421, 422 feed back the temporary results temp1, temp2 generated by the calculation circuits P0, P1 to the calculation circuit P0, while the multiplexers 423, 424 transmit the temporary results temp3, temp4 generated by the calculation circuits P2, P3 to the calculation circuit P1. The calculation circuit P0 generates the temporary result temp5=max (temp1,temp2), and the calculation circuit P1 generates the temporary result temp6=max (temp3,temp4).

In a third iteration, the multiplexers 421, 422 feed back the temporary results temp5, temp6 generated by the calculation circuits P0, P1 to the calculation circuit P0. The calculation circuit P0 generates the result (i.e. final=max (temp5,temp6)), and writes this result to the destination operand 430.

In the second embodiment, each calculation circuit includes two pipeline stages, therefore each iteration contains two clocks. Similar to the first embodiment, the pipeline stages also execute multiple reduction instructions in an interlaced manner in the second embodiment. In addition, when the pipeline stage F1 executes a certain reduction instruction, the pipeline stage F2 executes another reduction instruction.

Third Embodiment

Figure 8:
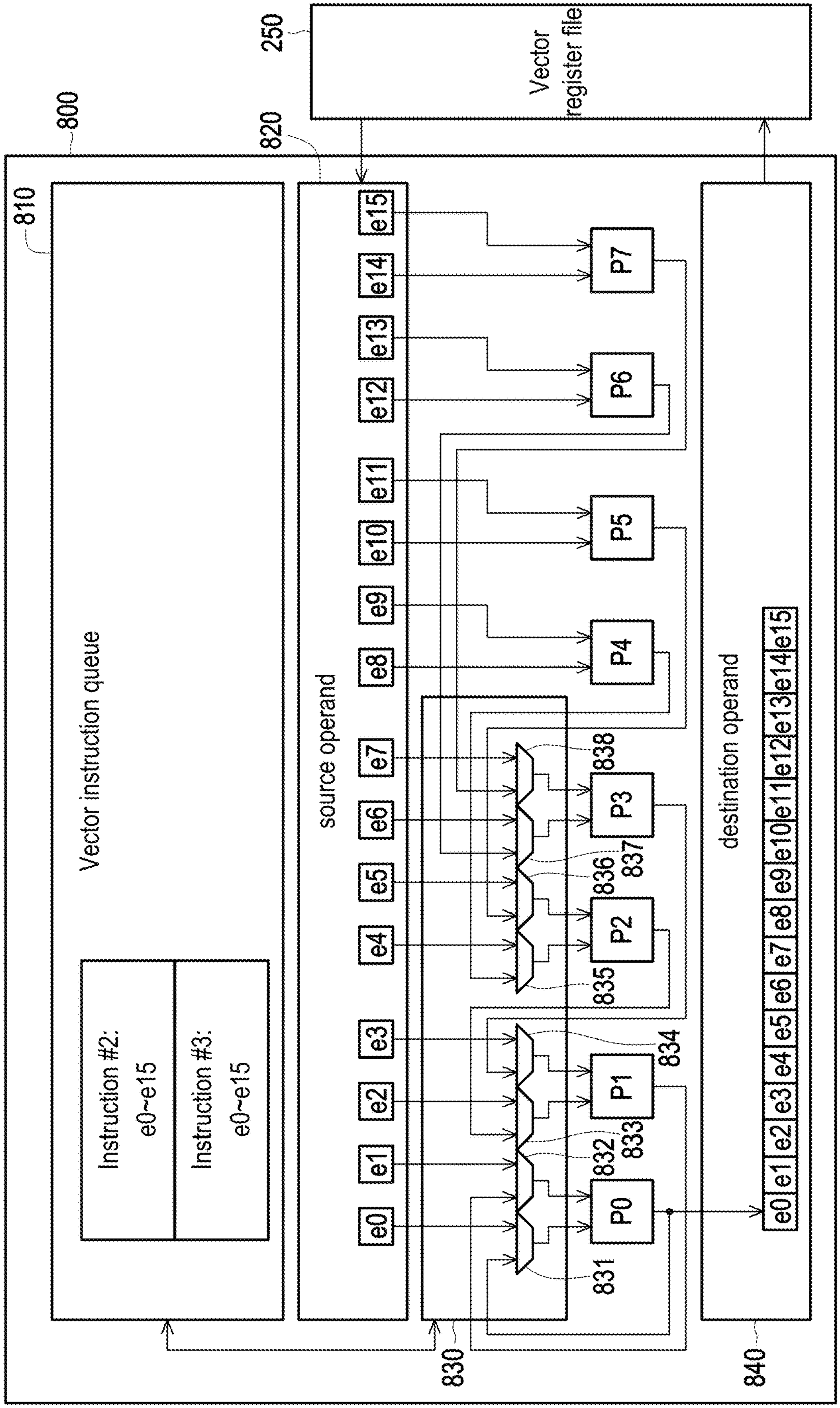
FIG. 8 is a schematic diagram illustrating a vector processing circuit according to a third embodiment.

In the third embodiment, a vector contains 16 elements, and the reduction instruction is configured to perform a reduce sum. FIG. 8 is a schematic diagram illustrating the vector processing circuit according to the third embodiment. Referring to FIG. 8, a vector processing circuit 800 includes a vector instruction queue 810 (also referred to as an instruction queue), a source operand 820, a selection circuit 830, calculation circuits P0-P7, and a destination operand 840. The source operand 820 and the selection circuit are collectively referred to a control circuit which is electrically connected to the instruction queue 810 and the calculation circuits P0-P7. The selection circuit 830 includes multiplexers 831-838. Among these, the calculation circuits P0-P3 are electrically connected to the selection circuit 830, while the calculation circuits P4-P7 are electrically connected to the selection circuit 830 and the source operand 820. The first input terminals of the multiplexers 831-838 are electrically connected to the source operand 820. The second input terminal of multiplexer 838 is electrically connected to the calculation circuit P7. The second input terminal of the multiplexer 837 is electrically connected to the calculation circuit P6.

The second input terminal of the multiplexer 836 is electrically connected to the calculation circuit P5. The second input terminal of the multiplexer 835 is electrically connected to the calculation circuit P4. The second input terminal of the multiplexer 834 is electrically connected to the calculation circuit P3. The second input terminal of the multiplexer 833 is electrically connected to the calculation circuit P2. The second input terminal of the multiplexer 832 is electrically connected to calculation circuit P1. The second input terminal of the multiplexer 831 is electrically connected to the calculation circuit P0.

In a first iteration, the multiplexers 831-838 transmit elements e0-e7 from the source operand 820 to the calculation circuits P0-P3, while the calculation circuits P4-P7 obtain elements e8-e15 from the source operand 820. The calculation circuit P0 generates a temporary result temp1=e0+e1, the calculation circuit P1 generates a temporary result temp2=e2+e3, the calculation circuit P2 generates a temporary result temp3=e4+e5, the calculation circuit P3 generates a temporary result temp4=e6+e7, the calculation circuit P4 generates a temporary result temp5=e8+e9, the calculation circuit P5 generates a temporary result temp6=e10+e11, the calculation circuit P6 generates a temporary result temp7=e12+e13, and the calculation circuit P7 generates a temporary result temp8=e14+e15.

In a second iteration, the multiplexers 837 and 838 transmit the temporary results temp7 and temp8 generated by the calculation circuits P6 and P7 to the calculation circuit P3. The multiplexers 835 and 836 transmit the temporary results temp5 and temp6 generated by the calculation circuits P4 and P5 to the calculation circuit P2. The multiplexers 833 and 834 transmit the temporary results temp3 and temp4 generated by the calculation circuits P2 and P3 to the calculation circuit P1. The multiplexers 831 and 832 transmit the temporary results temp1 and temp2 generated by the calculation circuits P0 and P1 to the calculation circuit P0. The calculation circuit P0 generates a temporary result temp9=temp1+temp2, the calculation circuit P1 generates a temporary result temp10=temp3+temp4, the calculation circuit P2 generates a temporary result temp11=temp5+temp6, and the calculation circuit P3 generates a temporary result temp12=temp7+temp8.

In a third iteration, the multiplexers 833 and 834 transmit the temporary results temp11 and temp12 generated by the calculation circuits P2 and P3 to the calculation circuit P1, and the multiplexers 831 and 832 transmit the temporary results temp9 and temp10 generated by the calculation circuits P0 and P1 to the calculation circuit P0. The calculation circuit P0 generates a temporary result temp13=temp9+temp10, and the calculation circuit P1 generates a temporary result temp14=temp11+temp12.

In a fourth iteration, the multiplexers 831 and 832 transmit the temporary results temp13 and temp14 generated by the calculation circuits P0 and P1 to the calculation circuit P0. The calculation circuit P0 generates a result (i.e. final=temp13+temp14), and transmits this result to the destination operand 840.

Similar to the first and second embodiments, the third embodiments also executes multiple reduction instructions in an interleaved manner. FIG. 9 is a table illustrating which pipeline stage processes which element in each clock according to the third embodiment. Referring to a table 900 in FIG. 9, in this embodiment, the 1st to 3rd clocks may also be called the first iteration, the 4th to 6th clocks may be called the second iteration, the 7th to 9th clocks may be called the third iteration, and the 10th to 12th clocks may be called the fourth iteration. For simplification, the table 900 does not draw other reduction instructions, but those skilled in the art may understand the related calculations of other reduction instructions according to FIG. 5.

In this embodiment, one vector includes 16 elements, therefore log 2 16=4 iterations are needed. Although more iterations are required, due to the adoption of the interleaved design, the throughput of the vector processing circuit is still be improved.

Fourth Embodiment

In the fourth embodiment, one vector includes 16 elements, and the reduction instruction is configured to perform a reduce maximum operation. In the fourth embodiment, the vector processing circuit is similar to that of the third embodiment (as shown in FIG. 8), with the difference being that the calculation circuits P0-P7 are configured to perform maximum value operations (as shown in FIG. 7).

In a first iteration, the multiplexers 831-838 transmit elements e0-e7 from the source operand 820 to the calculation circuits P0-P3, while the calculation circuits P4-P7 obtain elements e8-e15 from the source operand 820. The calculation circuit P0 generates a temporary result temp1=max (e0, e1), the calculation circuit P1 generates a temporary result temp2=max (e2,e3), the calculation circuit P2 generates a temporary result temp3=max (e4,e5), the calculation circuit P3 generates a temporary result temp4=max (e6,e7), the calculation circuit P4 generates a temporary result temp5=max (e8,e9), the calculation circuit P5 generates a temporary result temp6=max (e10,11), the calculation circuit P6 generates a temporary result temp7=max (e12,e13), and the calculation circuit P7 generates a temporary result temp8=max (e14,e15).

In a second iteration, the multiplexers 837 and 838 transmit the temporary results temp7 and temp8 generated by the calculation circuits P6 and P7 to the calculation circuit P3. The multiplexers 835 and 836 transmit the temporary results temp5 and temp6 generated by the calculation circuits P4 and P5 to the calculation circuit P2. The multiplexers 833 and 834 transmit the temporary results temp3 and temp4 generated by the calculation circuits P2 and P3 to the calculation circuit P1. The multiplexers 831 and 832 transmit the temporary results temp1 and temp2 generated by the calculation circuits P0 and P1 to the calculation circuit P0. The calculation circuit P0 generates a temporary result temp9=max (temp1,temp2), the calculation circuit P1 generates a temporary result temp10=max (temp3, temp4), the calculation circuit P2 generates a temporary result temp11=max (temp5,temp6), and the calculation circuit P3 generates a temporary result temp12=max (temp7, temp8).

In a third iteration, the multiplexers 833 and 834 transmit the temporary results temp11 and temp12 generated by the calculation circuits P2 and P3 to the calculation circuit P1, and the multiplexers 831 and 832 transmit the temporary results temp9 and temp10 generated by the calculation circuits P0 and P1 to the calculation circuit P0. The calculation circuit P0 generates a temporary result temp13=max (temp9,temp10), and the calculation circuit P1 generates a temporary result temp14=max (temp11,temp12).

In a fourth iteration, the multiplexers 831 and 832 transmit the temporary results temp13 and temp14 generated by the calculation circuits P0 and P1 to the calculation circuit P0. The calculation circuit P0 generates the result (i.e. final=max (temp13,temp14)), and transmits this result to the destination operand 840.

FIG. 10 is a table illustrating which pipeline stage processes which element in each clock according to the fourth embodiment. Referring to FIG. 10, for simplicity, a table 1000 only illustrates the elements of one reduction instruction. In this embodiment, the 1st to 2nd clocks are called the first iteration, the 3rd to 4th clocks are called the second iteration, the 5th to 6th clocks are called the third iteration, and the 7th to 8th clocks are called the fourth iteration. Similar to the first to third embodiments, the pipeline stages also execute multiple reduction instructions in an interleaved manner in the fourth embodiment. For example, when the pipeline stage F1 executes one reduction instruction, the pipeline stage F2 executes another reduction instruction.

In some embodiments, the aforementioned vector processing circuit may also be implemented in components outside the core, such as in a graphics processing unit, tensor processing unit (TPU), neural processing unit (NPU), and so on. Alternatively, in some embodiments, the vector processing circuit may also be implemented in electronic devices such as graphics cards, displays, etc.

Fifth Embodiment

Figure 12:
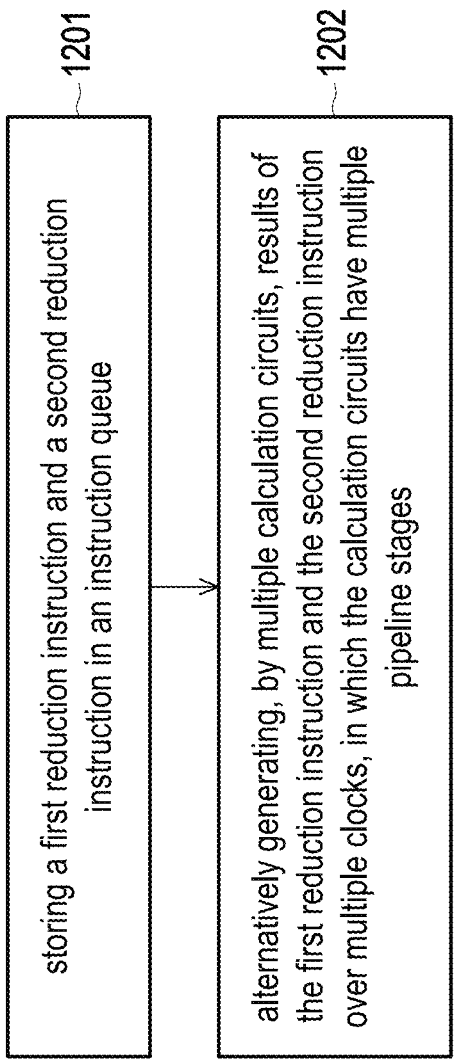
FIG. 12 is a diagram illustrating a flowchart of a vector processing method according to an embodiment.

FIG. 12 is a diagram illustrating a flowchart of a vector processing method according to an embodiment. Referring to FIG. 12, in step 1201, a first reduction instruction and a second reduction instruction are stored in an instruction queue. In step 1202, results of the first reduction instruction and the second reduction instruction are alternatively generated by multiple calculation circuits over multiple clocks. The calculation circuits have multiple pipeline stages. The method of FIG. 12 may be applied to the first to fourth embodiments.

In the vector processing circuit and the vector processing method proposed above, due to multiple pipeline stages being implemented in each calculation circuit, where these pipeline stages execute multiple reduction instructions in an interlaced manner, which may increase overall throughput. On the other hand, multiple calculation circuits are reused, which may reduce circuit costs.

Although the present invention has been disclosed by the above examples, it is not intended to limit the invention. Any person skilled in the art may make minor modifications and refinements without departing from the spirit and scope of this invention. Therefore, the protection scope of the present invention should be defined by the appended claims.

What is claimed is:

1. A vector processing circuit, comprising:

an instruction queue, wherein the instruction queue comprises a first reduction instruction and a second reduction instruction, a plurality of calculation circuits, wherein the calculation circuits have a plurality of pipeline stages, the plurality of the calculation circuits are identical to each other, and the plurality of the calculation circuits comprises a first calculation circuit and a second calculation circuit; and a control circuit, comprising a source operand and a selection circuit, wherein the source operand is electrically connected to the second calculation circuit, and the selection circuit is electrically connected to the source operand, the first calculation circuit and the second calculation circuit, wherein the plurality of calculation circuits alternatively generates results of the first reduction instruction and the second reduction instruction over a plurality of clocks, wherein in a first iteration, the selection circuit transmits a first element of the source operand to the first calculation circuit and the second calculation circuit receives a second element of the operand, wherein in a second iteration after the first iteration, the selection circuit transmits a temporary result generated by the second calculation circuit to the first calculation circuit, and the selection circuit transmits a temporary result generated by the first calculation circuit back to the first calculation circuit, wherein the results of the first reduction instruction and the second reduction instruction are generated by the first calculation circuit, wherein the plurality of calculation circuits sequentially generates temporary results of the first reduction instruction, temporary results of the second reduction instruction, a final result of the first reduction instruction, and a final result of the second reduction instruction, wherein the temporary results consist of multiple elements, and the final result is a scalar element.

2. The vector processing circuit according to claim 1, wherein the selection circuit comprises a multiplex, wherein inputs of the multiplex are connected to the source operand and the second calculation circuit, wherein an output of the multiplex is connected to the first calculation circuit.

3. The vector processing circuit according to claim 1, wherein the first and the second reduction instructions are floating-point reduction instructions, wherein the pipeline stages comprise a shift stage.

4. The vector processing circuit according to claim 1, wherein the first and the second reduction instructions are floating point reduction sum instructions, wherein the pipeline stages comprise a normalization stage.

5. A vector processing method performed by a vector processing circuit, the vector processing method comprising:

storing a first reduction instruction and a second reduction instruction in an instruction queue; and alternatively generating, by a plurality of calculation circuits, results of the first reduction instruction and the second reduction instruction over a plurality of clocks, wherein the calculation circuits have a plurality of pipeline stages, the plurality of the calculation circuits are identical to each other, and the plurality of the calculation circuits comprises a first calculation circuit and a second calculation circuit, and the step of alternatively generating the results of the first reduction instruction and the second reduction instruction comprises:

in a first iteration, transmitting a first element of a source operand to the first calculation circuit and the second calculation circuit receives a second element of the operand; and in a second iteration after the first iteration, transmitting a temporary result generated by the second calculation circuit to the first calculation circuit, and transmitting a temporary result generated by the first calculation circuit back to the first calculation circuit, wherein the results of the first reduction instruction and the second reduction instruction are generated by the first calculation circuit, wherein the plurality of calculation circuits sequentially generates temporary results of the first reduction instruction, temporary results of the second reduction instruction, a final result of the first reduction instruction, and a final result of the second reduction instruction, wherein the temporary results consist of multiple elements, and the final result is a scalar element.

6. The vector processing method according to claim 5, wherein the first and the second reduction instructions are floating-point reduction instructions, wherein the pipeline stages comprise a shift stage.

7. The vector processing method according to claim 5, wherein the first and the second reduction instructions are floating point reduction sum instructions, wherein the pipeline stages comprise a normalization stage.

* * * * *